US010591168B2

(12) United States Patent
Yang et al.

(10) Patent No.: US 10,591,168 B2
(45) Date of Patent: Mar. 17, 2020

(54) COUNTERTOP OVEN

(71) Applicant: Hamilton Beach Brands, Inc., Glen Allen, VA (US)

(72) Inventors: Weiqun Yang, Henrico, VA (US); Michael Garman, Stafford, VA (US); Amy Hollister, Henrico, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 307 days.

(21) Appl. No.: 15/656,117

(22) Filed: Jul. 21, 2017

(65) Prior Publication Data

US 2019/0024906 A1 Jan. 24, 2019

(51) Int. Cl.
F24C 15/04 (2006.01)
F24C 15/02 (2006.01)
A47J 37/06 (2006.01)
F24C 15/30 (2006.01)
A47J 37/08 (2006.01)

(52) U.S. Cl.
CPC .......... F24C 15/026 (2013.01); A47J 37/0629 (2013.01); A47J 37/0635 (2013.01); F24C 15/028 (2013.01); F24C 15/045 (2013.01); A47J 37/08 (2013.01); F24C 15/023 (2013.01)

(58) Field of Classification Search
CPC .... F24C 15/045; F24C 15/026; F24C 15/023; F24C 15/04; F24C 15/30; F24C 15/028; A47J 37/0629; A47J 37/08
USPC .................................................. 126/200, 190
See application file for complete search history.

(56) References Cited

U.S. PATENT DOCUMENTS

| 120,439 | A | * | 10/1871 | House | F24B 7/002 126/6 |
| 180,605 | A | * | 8/1876 | Lee et al. | A47F 3/06 312/139 |
| 250,356 | A | * | 12/1881 | Hess et al. | F24C 15/02 126/190 |
| 759,188 | A | * | 5/1904 | Ott | F24C 15/023 126/191 |

(Continued)

FOREIGN PATENT DOCUMENTS

| DE | 3604669 A1 * | 8/1987 | ............ F24B 13/004 |
| JP | 55158429 A * | 12/1980 | |
| JP | 59161619 A * | 9/1984 | .......... A47J 37/0635 |

OTHER PUBLICATIONS

"DE_3604669_A1_M—Machine Translation.pdf", machine translation, EPO.Org, Jul. 22, 2019.*

Primary Examiner — Steven B McAllister
Assistant Examiner — Daniel E. Namay
(74) Attorney, Agent, or Firm — Alexander D. Raring

(57) ABSTRACT

A countertop oven includes a housing having a rear panel, an upper panel, a bottom panel, a first side panel, an opposing second side panel and an open front end, together defining a cooking cavity therebetween. The cooking cavity is accessible via the open front end of the housing. At least one heating element within the housing selectively heats the cooking cavity. A door is movably attached to the housing via at least one 4-bar linkage mechanism. The door is selectively movable between a closed position, wherein the open front end of the housing is covered by the door, and an open position, wherein the door is positioned generally atop the upper panel of the housing, thereby uncovering the open front end of the housing to access the cooking cavity.

14 Claims, 6 Drawing Sheets

(56) References Cited

U.S. PATENT DOCUMENTS

| | | | |
|---|---|---|---|
| 2,989,915 A | 6/1961 | Lonzi | |
| 3,180,248 A | 4/1965 | Mell | |
| 3,343,904 A * | 9/1967 | Laug | E06B 3/385 126/191 |
| 3,693,538 A * | 9/1972 | Synder | A47J 37/0635 99/447 |
| 3,756,219 A | 9/1973 | Snyder et al. | |
| 3,845,272 A * | 10/1974 | Schultz | A47J 37/0878 219/386 |
| 4,189,632 A * | 2/1980 | Swanson | A47J 37/0623 126/191 |
| 4,213,446 A * | 7/1980 | Stookey | F24B 1/02 126/192 |
| 4,556,044 A * | 12/1985 | Barsness | F24B 1/028 126/146 |
| 4,754,121 A | 6/1988 | Fujino et al. | |
| 5,483,947 A | 1/1996 | Giebel et al. | |
| 5,866,876 A | 2/1999 | Su | |
| D413,041 S | 8/1999 | Lin-Yun | |
| 5,934,180 A | 8/1999 | Lin | |
| 6,029,649 A * | 2/2000 | Su | A47J 37/0623 126/19 R |
| D422,172 S | 4/2000 | Hsu | |
| D423,280 S | 4/2000 | Lin | |
| D433,867 S | 11/2000 | Hsu | |
| D438,421 S | 3/2001 | Su | |
| 6,199,548 B1 | 3/2001 | Hsu | |
| 6,242,716 B1 * | 6/2001 | Wang | A47J 37/0623 219/404 |
| 6,271,502 B1 | 8/2001 | Lee | |
| D451,333 S | 12/2001 | Hsu | |
| 6,707,009 B1 | 3/2004 | Ancona et al. | |
| D501,356 S | 2/2005 | Averty | |
| 7,021,203 B2 | 4/2006 | Backus et al. | |
| 2006/0131296 A1 | 6/2006 | Wong | |
| 2007/0251519 A1 * | 11/2007 | Anikhindi | E05D 15/20 126/194 |
| 2012/0060821 A1 * | 3/2012 | McNamee | E05D 15/46 126/197 |
| 2014/0246418 A1 * | 9/2014 | Ye | A47J 37/08 219/391 |
| 2016/0298856 A1 * | 10/2016 | Trood | F24C 15/023 |
| 2016/0374157 A1 * | 12/2016 | Ham | F24C 15/023 |

\* cited by examiner

COUNTERTOP OVEN

BACKGROUND OF THE INVENTION

The present disclosure relates generally to a countertop oven for heating foodstuff and, more particularly, to a counter top oven having a 4-bar linkage mechanism attaching the oven door and the oven housing.

Countertop ovens are used to toast, bake, broil, or reheat foodstuff. Conventional countertop ovens typically include a housing defining a cooking cavity within, with an opening to access the cooking cavity. A door is generally hingedly affixed to open forwardly of the housing to selectively enable access (when the door is in an open position) or block access (when the door is in a closed position) to the cooking cavity. The door is typically either hinged at the top edge such that the door opens upwardly and away from the cooking cavity or at the bottom edge such that the door opens downwardly and away from the cooking cavity.

Countertop ovens are manufactured in different sizes to accommodate a variety of different user requirements. Large countertop ovens, for example, may be approximately 12 inches high, 21 inches wide, and 17 inches deep and define a cooking cavity approximately 9.5 inches high, 13 inches wide, and 13.5 inches deep. Pursuant to their name, countertop ovens are generally placed atop a countertop, such as a kitchen countertop. Generally, standard kitchen cabinets are installed between 16 inches to 18 inches above the countertop according to code. Consequently, one challenge associated with manufacturing and selling, specifically, the larger size countertop ovens, where the door opens away from the cooking cavity is ensuring sufficient countertop or cabinet clearance. Overhanging cabinetry in a conventional home kitchen generally prevents the door to move upwardly, unimpeded, between the open and closed positions thereof.

Therefore, for countertop ovens where the door opens upwardly, it would be advantageous to invent a mechanism between the housing and the door that would enable the door to move between the open and closed positions thereof in close proximity to the oven housing, in order to clear low cabinetry.

BRIEF SUMMARY OF THE INVENTION

Briefly stated, one aspect of the present invention is directed to a countertop oven including a housing having a rear panel, an upper panel, a bottom panel, a first side panel, an opposing second side panel and an open front end, together defining a cooking cavity therebetween. The cooking cavity is accessible via the open front end of the housing. At least one heating element within the housing selectively heats the cooking cavity. A door is movably attached to the housing via at least one 4-bar linkage mechanism. The door is selectively movable between a closed position, wherein the open front end of the housing is covered by the door, and an open position, wherein the door is positioned generally atop the upper panel of the housing, thereby uncovering the open front end of the housing to access the cooking cavity.

Another aspect of the present invention is directed to a countertop oven including a housing having a rear panel, an upper panel, a bottom panel, a first side panel, an opposing second side panel and an open front end, together defining a cooking cavity therebetween. The cooking cavity is accessible via the open front end of the housing. At least one heating element within the housing selectively heats the cooking cavity. A door is movably attached to the housing between a closed position, wherein the open front end of the housing is covered by the door, and an open position, wherein the door is positioned generally atop the upper panel of the housing, thereby uncovering the open front end of the housing to access the cooking cavity. The door includes a glass panel pivotably attached to the door at one end thereof and selectively, removably latched to the door at an opposing end thereof. Unlatching of the opposing end of the glass panel from the door permits pivoting of the glass panel relative to the door.

Another aspect of the present invention is directed to a countertop oven including a housing having a rear panel, an upper panel, a bottom panel, a first side panel, an opposing second side panel and an open front end, together defining a cooking cavity therebetween. The cooking cavity is accessible via the open front end of the housing. At least one heating element within the housing selectively heats the cooking cavity. A door is movably attached to the housing between a closed position, wherein the open front end of the housing is covered by the door, and an open position, wherein the door is positioned generally atop the upper panel of the housing, thereby uncovering the open front end of the housing to access the cooking cavity. The door includes a glass panel removably attached thereto.

BRIEF DESCRIPTION OF THE DRAWINGS

The foregoing summary, as well as the following detailed description of the disclosure, will be better understood when read in conjunction with the appended drawings. For the purpose of illustrating the disclosure, there are shown in the drawings embodiments of a countertop oven which are presently preferred. It should be understood, however, that the disclosure is not limited to the precise arrangements and instrumentalities shown. In the drawings.

DESCRIPTION OF THE DISCLOSURE

Figure 1:
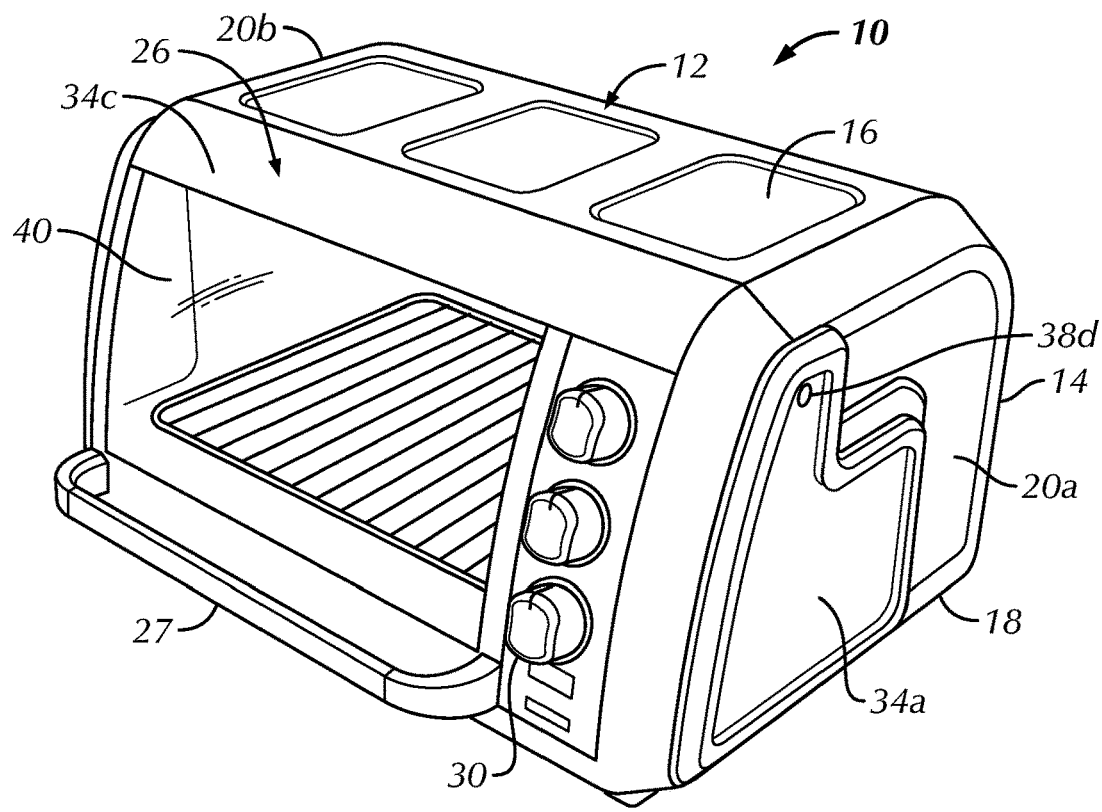
FIG. 1 is a top, front and side perspective view of a countertop oven, in accordance with a first preferred embodiment of the present disclosure, with a door of the oven in a closed position thereof.
Figure 2:
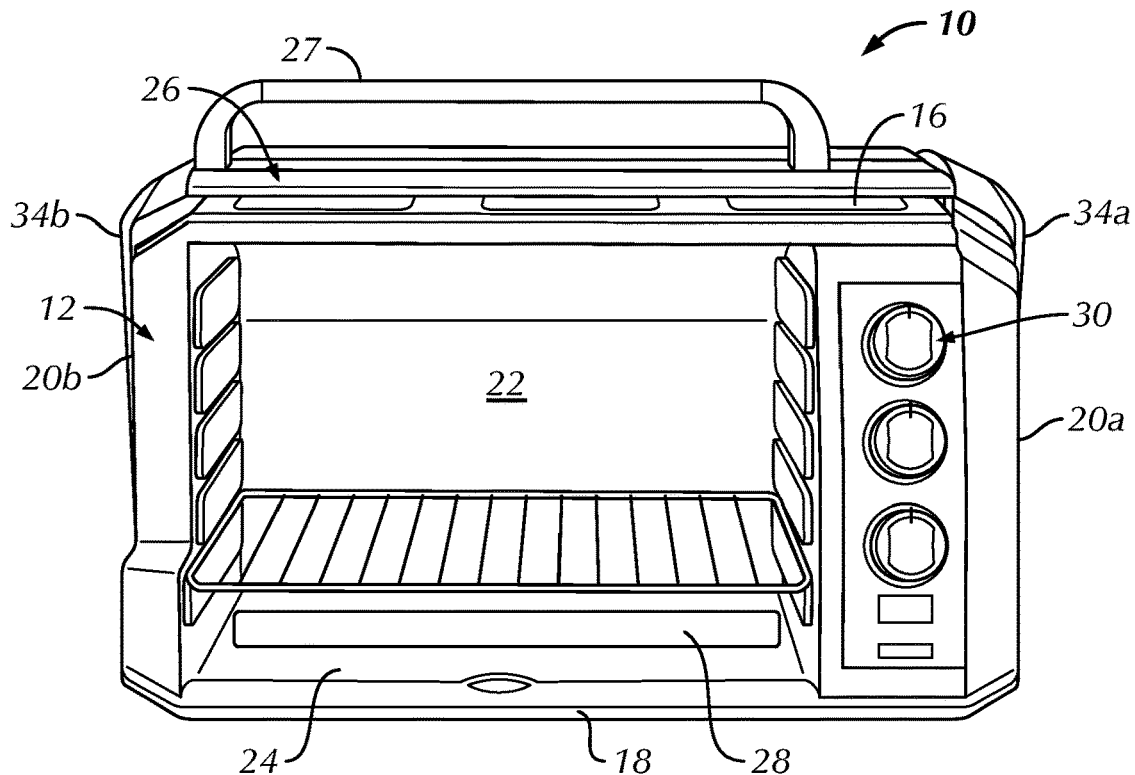
FIG. 2 is a front elevational view of the countertop oven of FIG. 1, with the door in an open position thereof.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the countertop oven, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS. 1-7 a countertop oven, generally designated 10, in accordance with a first embodiment of the present invention. The countertop oven 10 comprises a body/housing 12 having a real panel 14, an upper panel 16, a bottom panel 18, and opposing side panels 20a, 20b together defining a cooking cavity 22. In the illustrated embodiment, the panels 14, 16, 18, 20a, 20b of the housing 12 are generally planar, but the disclosure is not so limited. An open front end 24 is defined in the housing to enable access to the cooking cavity 22. The countertop oven 10 further comprises a door 26 movably attached to the housing 12 via at least one linkage mechanism and selectively movable between a closed position (see FIG. 3A), wherein the open front end 24 of the housing 12 is covered by the door 26, and an open position (see FIG. 3B), wherein the door 26 is positioned generally atop the upper panel 16 of the housing 12, thereby uncovering the open front end 24 of the housing 12 for access to the cooking cavity 22, as will be explained in further detail below.

Advantageously, a portion of the front edge of at least one of the side panels 20a, 20b of the housing 12 is recessed back from a front panel 34c of the door 26 when the door is in the closed position. As described in U.S. Patent Application Publication No. 2014/0246418, which is incorporated by reference as if fully set forth herein, this cutaway portion of the side panel provides greater access to the cooking cavity 22 when the door 26 is open, thereby enabling a user to more easily reach foodstuff placed toward the back of the cooking cavity 22.

The countertop oven 10 further comprises at least one conventional heating element 28 (shown schematically in FIG. 2), well known by those of ordinary skill in the art, to selectively heat the cooking cavity 22 and the foodstuff therein, e.g., to toast, bake, broil, reheat or the like. Typically, at least one upper heating element (not illustrated) is positioned at or near the top of the cooking cavity 22 and at least one lower heating element is positioned at or near the bottom of the cooking cavity 22, although placement and quantity of the elements may vary. To specify and control the operation of the oven 10, the housing 12 also includes a user interface 30, having a variety of user selection inputs and outputs, such as, for example, a function, a temperature control, a timer, foodstuff selection, and the like.

Turning to the linkage mechanism (shown best in FIGS. 3A, 3B), a first side panel 34a of the door 26 is connected to the first side panel 20a of the housing 12 via a 4-bar linkage mechanism, e.g., a quadrilateral 4-bar linkage. As should be understood by those of ordinary skill in the art, a 4-bar linkage mechanism is comprised of four links and four joints. As shown, the first side panel 20a of the housing 12 defines a first link, the first side panel 34a of the door 26 defines a second link, a first rocker bar 36a, pivotably attached at one end thereof to the door 26 and pivotably attached at an opposing end thereof to the side panel 20a, defines a third link, and a second rocker bar 36b, pivotably attached at one end thereof to the door 26 and pivotably attached at an opposing end thereof to the side panel 20a, defines the fourth link.

The pivotive joint between first rocker bar 36a and the side panel 20a of the housing 12 defines the first joint 38a, the pivotable joint between the second rocker bar 36b and the side panel 20a of the housing 12 defines the second joint 38b, the pivotable joint between the first rocker bar 36a and the door 26 defines the third joint 38c and the pivotable joint between the second rocker bar 36b and the door 26 defines the fourth joint 38d. Accordingly, the side panel 20a of the housing 12 functions as the ground link of the 4-bar linkage mechanism and the door 26 functions as the coupler link of the 4-bar linkage mechanism.

An opposing second side panel 34b of the door 26 may also be connected to the second side panel 20b of the housing 12 via the same, or similar, 4-bar linkage mechanism (not shown), but the disclosure is not so limited. The opposing side panels 34a, 34b of the door 26 may be mirror images of each other, or may each have a different appearance.

Figure 3A:
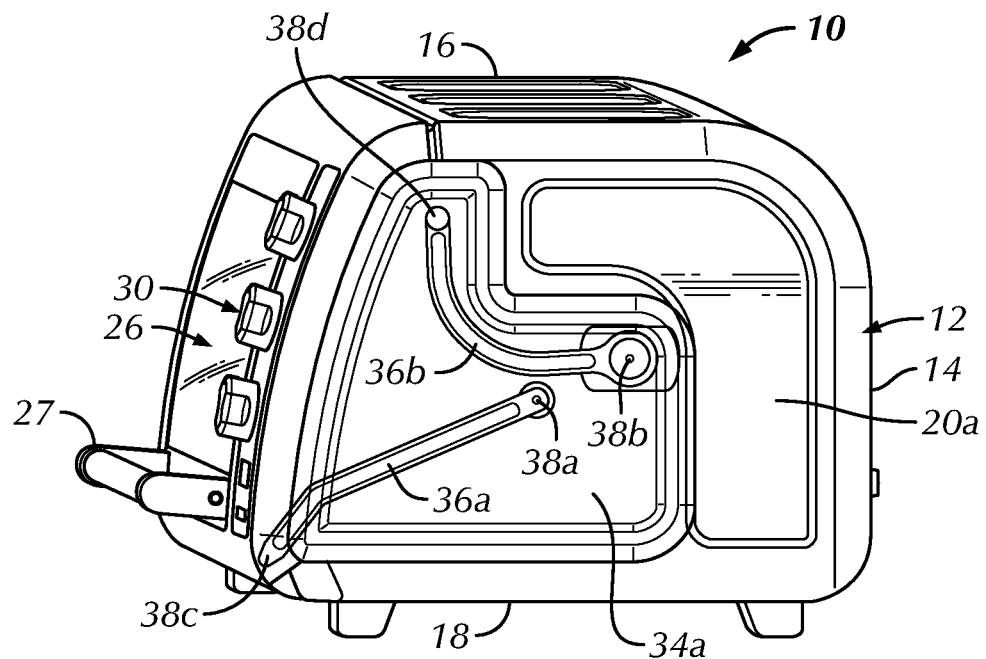
FIG. 3A is a front and side perspective view of the countertop oven of FIG. 1, with the door in the closed position thereof, with a transparent side panel of the door showing the 4-bar linkage mechanism.
Figure 3B:
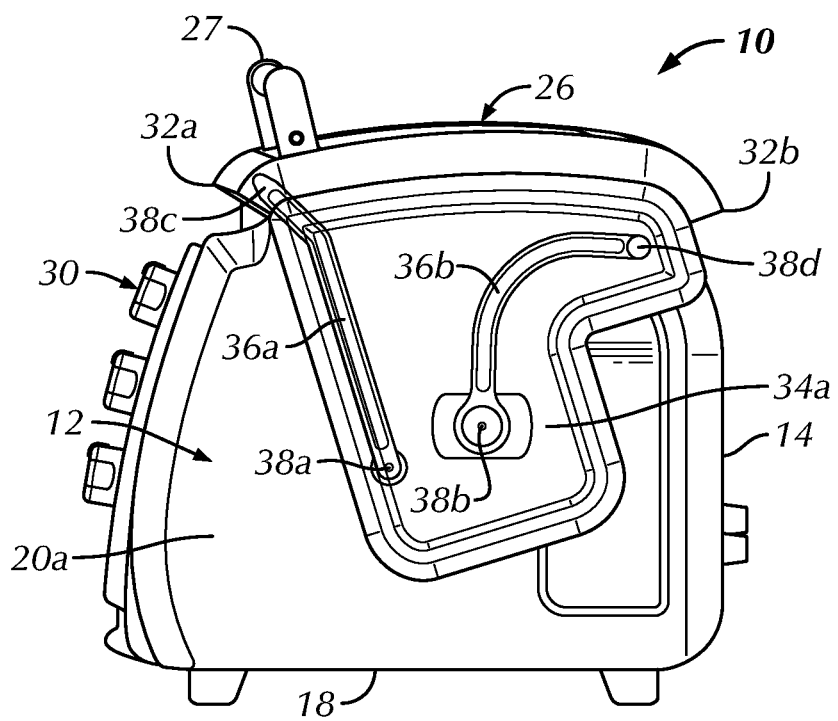
FIG. 3B is a front and side perspective view of the countertop oven of FIG. 1, with the door in the open position thereof, with the transparent side panel of the door showing the 4-bar linkage mechanism.

As shown best in FIG. 3B, the pivotable joint/attachment 38c between the first rocker bar 36a and the door 26 is positioned proximate a first (non-limiting e.g., lower) edge 32a of the door 26, and the pivotable joint/attachment 38d between the second rocker bar 36b and the door 26 is positioned proximate an opposing second (non-limiting e.g., upper) edge 32b of the door 26. The pivotable joints 38a, 38b are positioned generally centrally relative to the side panel 20a of the housing 12. Advantageously, the door 26 does not pivot about one pivot axis, generally positioned proximate a corner of the housing 12, wherein the height of the door determines the radius of rotation thereof, as in traditional ovens. Rather, the 4-bar linkage mechanism (four links and four joints as described above), in combination with the positioning of the pivotable joints/attachments 38a-d, permits the door 26 to move between the open and closed positions thereof about a radius of rotation defining a close proximity to the housing 12. The door 26 rotates about generally central axes defined by the pivotable joints 38a, 38b, in combination with the first edge 32a of the door 26 pivoting about the pivot joint 38c, and the second edge 32b of the door 26 pivoting about the pivot joint 38d. Preferably, the door 26 is spaced upwardly from the upper panel 16 of the housing 12 by between approximately 15 mm to approximately 40 mm, in the open position of the door 26.

Turning to the features of the door 26, the front panel 34c extends between the side panels 34a, 34b. As shown, a portion of the front panel 34c comprises a glass (or otherwise transparent) panel 40 extending across at least a portion of the open front end 24 of the housing 12, to enable a user to view the cooking cavity 22. A handle 27 is affixed to the door 26 to enable a user to easily move the door 26 between the open and closed positions thereof. In the illustrated embodiment, the handle 27 is affixed to the glass panel 40, but the disclosure is not so limited.

Due to the 4-bar linkage mechanism between the housing 12 and the door 26, the interior side of the glass panel 40 remains in facing orientation with the housing 12 in both the open and closed positions of the door 26. Also due to the 4-bar linkage mechanism, the front panel 34c, including the glass panel 40, of the door 26 is in close proximity to the upper panel 16 of the housing 12 in the open position of the door 12. As shown best in FIGS. 4-5B, however, the glass panel 40 is pivotably attached to the front panel 34c of the door 26, and pivotable between open (FIGS. 5A, 5B) and closed (FIG. 3A, 3B) positions thereof.

Figure 4:
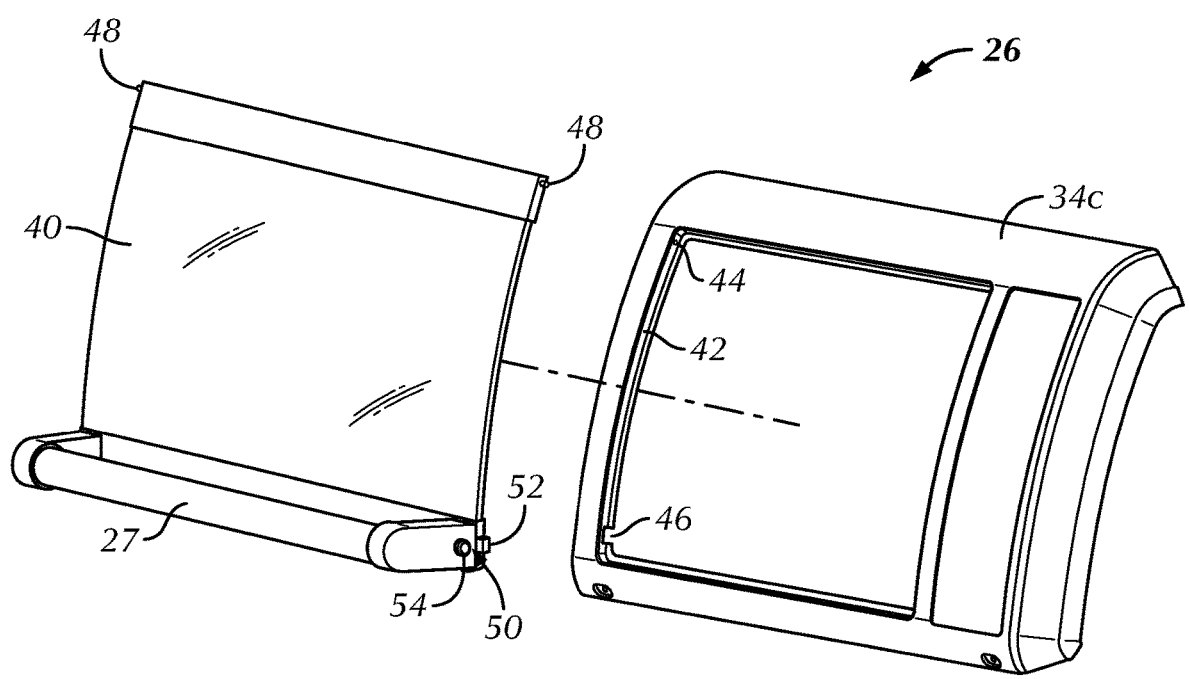
FIG. 4 is a front and side exploded, perspective view of a front panel of the door of the countertop oven of FIG. 1.

As shown best in FIG. 4, the front panel 34c includes a window frame 42, seating the pivotably attached glass panel 40 therein, in the closed position of the panel 40. The frame 42 comprises a pair of laterally opposed apertures 44 therein (only one of the apertures 44 shown), proximate a first (non-limiting e.g., upper) end thereof. The window frame 42 further comprises at least one slot 46 therein, proximate an opposing second (non-limiting e.g., lower) end thereof. Correspondingly, the glass panel 40 includes two opposing pins 48 laterally extending from opposing sides (non-limiting e.g., left and right) of the panel 40, proximate a first (non-limiting e.g., upper) end thereof. The pins 48 are engaged, respectively, with the apertures 44, creating a pivot axis extending therethrough, about which the glass panel 40 is pivotable (see FIGS. 5A, 5B). As should be understood, a rod 48 extending laterally across the glass panel 40, rather than the pins 48, may alternatively be employed, wherein opposing sides of the rod 48 are engaged with the apertures 44.

Proximate a second (non-limiting e.g., lower) end of the glass panel 40 is a locking latch 50. In the illustrated embodiment, the locking latch 50 is positioned in the handle 27, but the disclosure is not so limited. The locking latch 50 comprises a latch member 52 biased into engagement with the slot 46 by a biasing member (not shown). As should be understood, the biasing member may be any member capable of storing and releasing energy. Non-limiting examples of the biasing member include a leaf spring, a coil spring and the like. Thus, the locking latch 50 is biased into locking engagement with the slot 46 to secure the glass panel 40 in the closed position thereof.

Figure 5A:
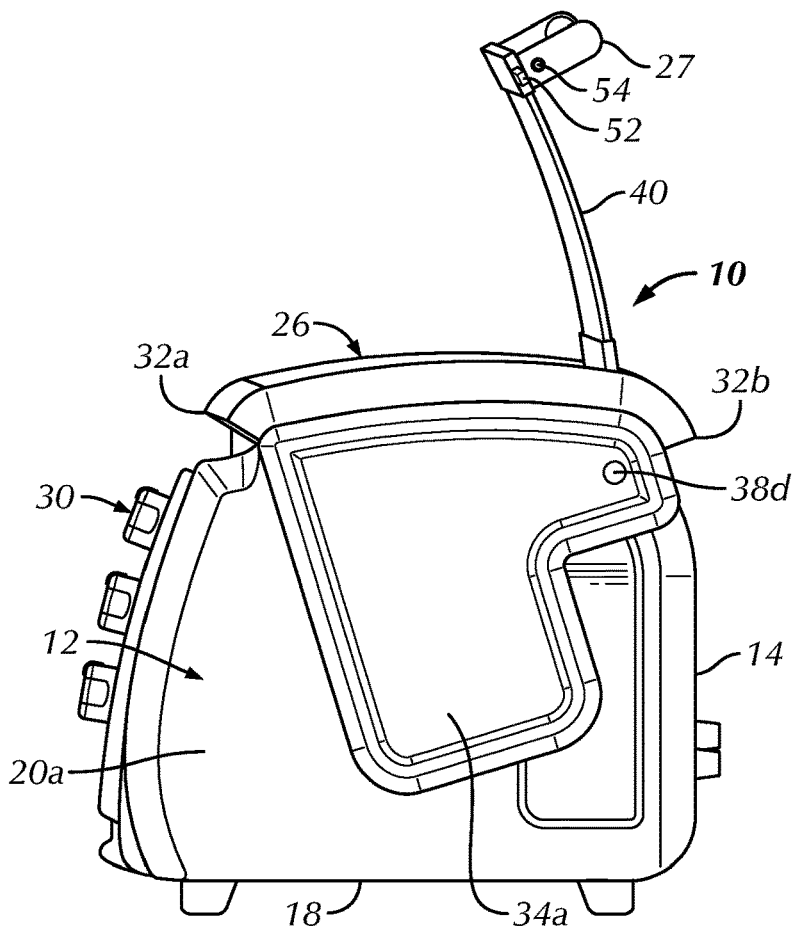
FIG. 5A is a front and side perspective view of the countertop oven of FIG. 1, with the door in the open position thereof, and a glass panel of the door in an open position thereof.
Figure 5B:
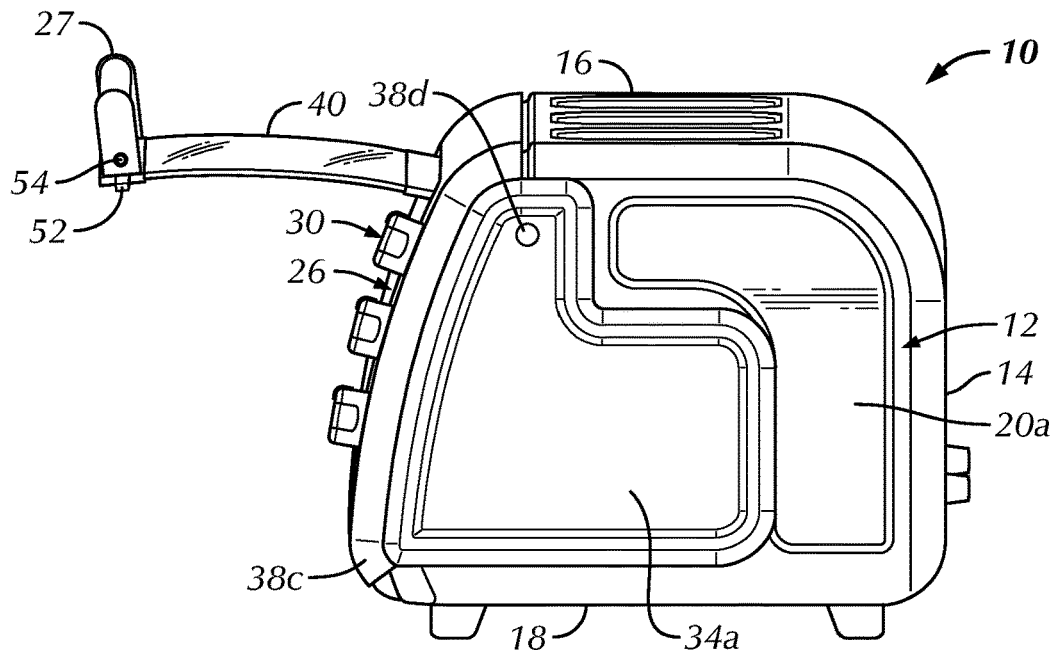
FIG. 5B is a side perspective view of the countertop oven of FIG. 1, with the door in the closed position thereof, and the glass panel of the door in the open position thereof.

To disengage the locking latch 50, a button 54, connected to the latch member 52, is selectively depressed, to counter and overcome the biasing force of the biasing member and retract the latch member 52 from the slot 46. The glass panel 40 is pivotable relative to the door 26 (about the pivot axis extending through the pins 48) into the open position thereof with the locking latch 50 disengaged from the slot 46. In one embodiment, the glass panel 40 may be pivoted approximately 145° relative to the front panel 34c of the door 26. As shown in FIGS. 5A and 5B, the glass panel 40 is movable into the open position thereof, in either of the open (FIG. 5A) or closed (FIG. 5B) positions of the door 26. In the open position of the glass panel 40, a user may access and clean the interior side of the panel 40. In the open position of the glass panel 40, with the door 26 in the closed position thereof, as shown in FIG. 5B, the cooking cavity 22 is also accessible. When the glass panel 40 is selectively pivoted back to the closed position thereof (by pivoting the panel 40 in the opposite direction), the locking latch 50 re-engages with the slot 46 under the biasing force of the biasing member, to secure the glass panel 40 in the closed position.

Figure 6A:
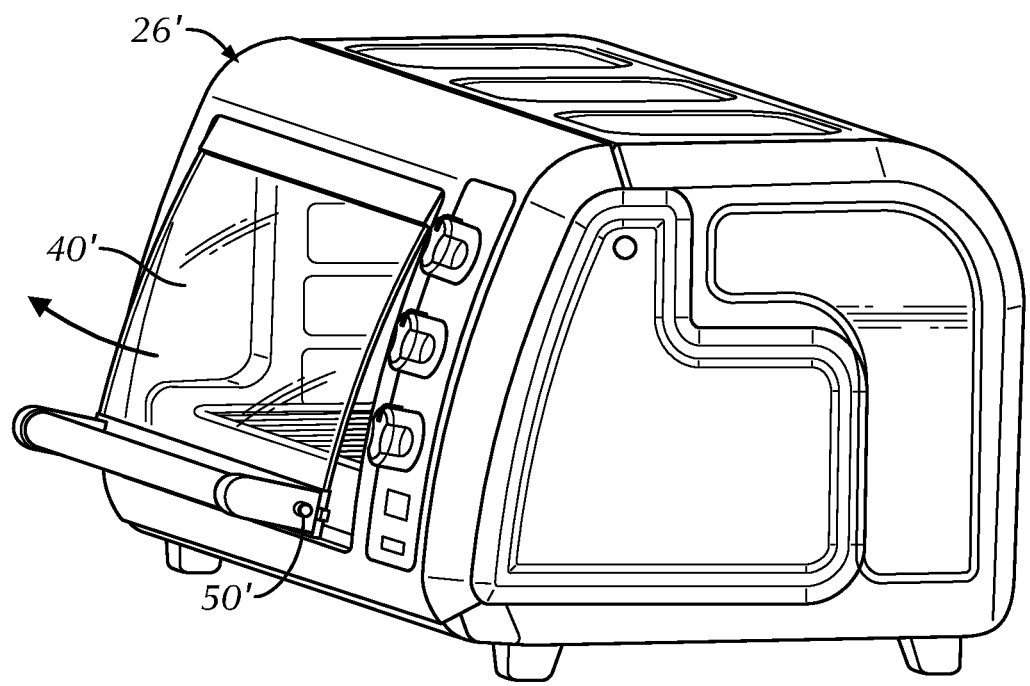
FIG. 6A is a front and side perspective view of the countertop oven of FIG. 1, with the door in the closed position thereof, and an alternative configuration of the glass panel of the door being unlatched from the door.
Figure 6B:
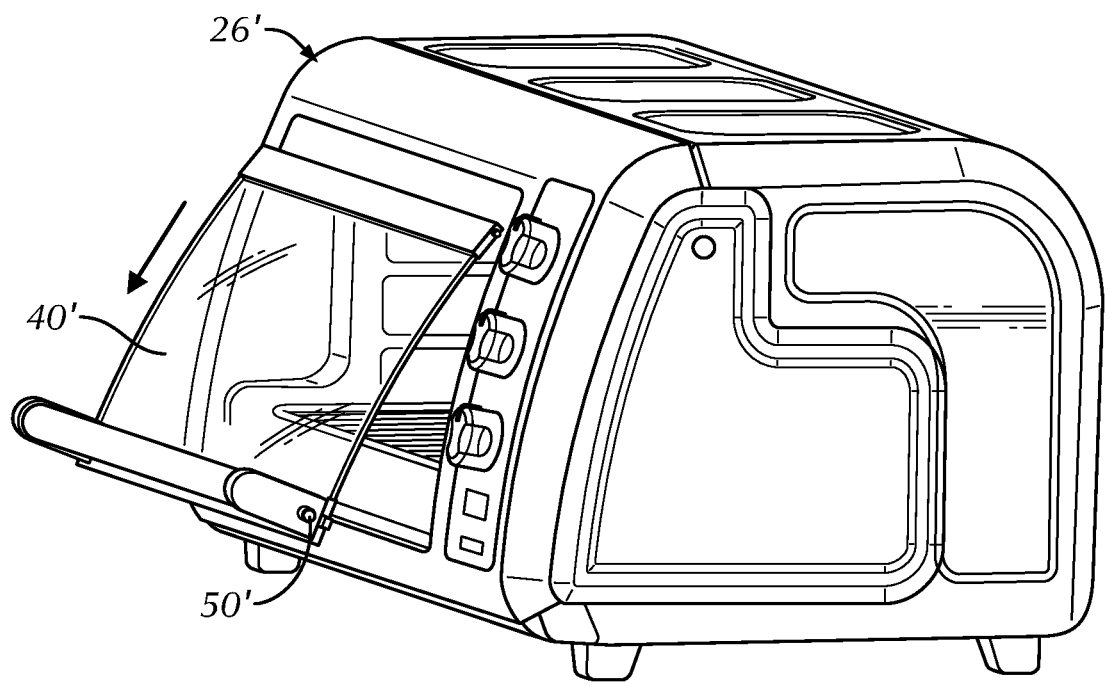
FIG. 6B is a front and side perspective view of the countertop oven of FIG. 1, with the door in the closed position thereof, and the alternative configuration of the glass panel of the door being detached from the door.
Figure 7:
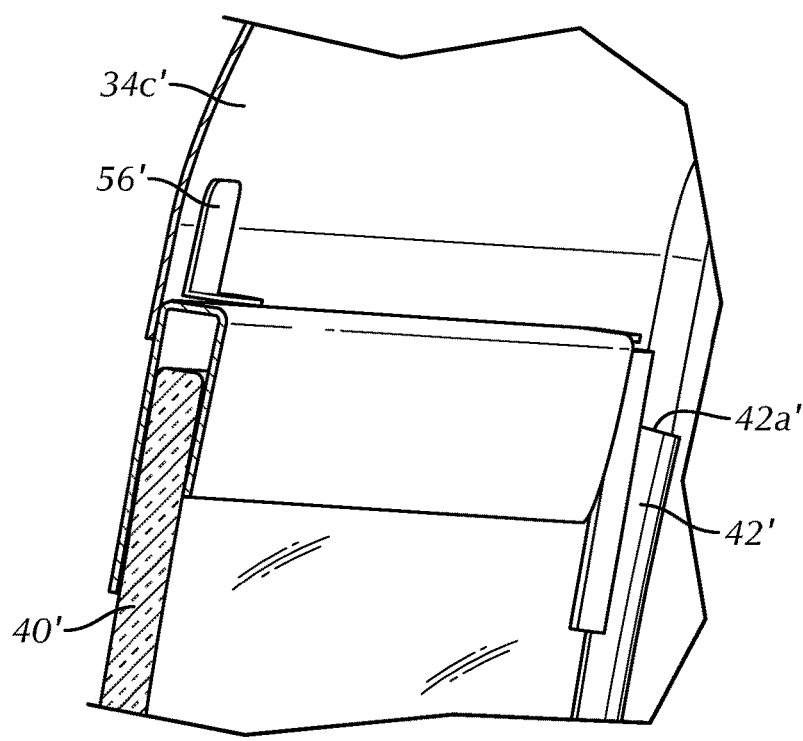
FIG. 7 is an enlarged, partial view of an underside of the door of FIGS. 6A and 6B.

In an alternative configuration of the door 26, as shown in FIGS. 6A-7, the glass panel 40' is selectively detachable from the door 26'. As shown in FIGS. 6A, 6B, the glass panel 40' includes a locking latch 50' proximate a second end of the panel 40', operable as described with respect to the locking latch 50 of the previous configuration of the door 26, to selectively detach the second end of the panel 40' from the door 26'. In contrast to the glass panel 40, the opposing first end of the glass panel 40' is also selectively detachable from the door 26'.

As shown best in FIG. 7, the window frame 42' defines an open first (non-limiting e.g., upper) end 42a', such that the glass panel 40' is slidable past the first end 42a' of the window frame 42' to underlie a portion of the front panel 34c' of the door 26'. Thus, in the closed position of the glass panel 40', the first end thereof is secured between the window frame 42' and the front panel 34c'. The door 26' (the front panel 34c' in the illustrated embodiment) includes a stopper bracket 56' spaced from the first end of 42a' of the window frame 42' and affixed to an underside of the door 26'. The stopper bracket 56' is positioned to permit a portion of the glass panel 40' to slide past the window frame 42' and underneath the front panel 34c' of the door 26', while also providing a boundary for the extension of the glass panel 40' underneath the panel 34c'. As should be understood, however, the frame 42' may alternatively be constructed to extend underneath the front panel 34c' and have a closed first end to function as the stopper bracket 56'.

To detach the glass panel 40', as shown in FIGS. 6A, 6B, the locking latch 50' is disengaged from the slot 46 (as shown in FIG. 4) as described with respect to the locking latch 50. The glass panel 40' is then pulled away from the door 26' and slid out of the window frame 42'. Upon removal, the glass panel 40' may, for example, be washed or otherwise cleaned. To re-attach the glass panel 40', the glass panel 40' is slid back into seated engagement with the window frame 42'. Thus, the first end of the panel 40' is re-secured between the window frame 42' and the front panel 34c' and the locking latch 50' re-engages with the slot 46 under the biasing force of the biasing member, to secure the glass panel 40' in the closed position.

Figure 8:
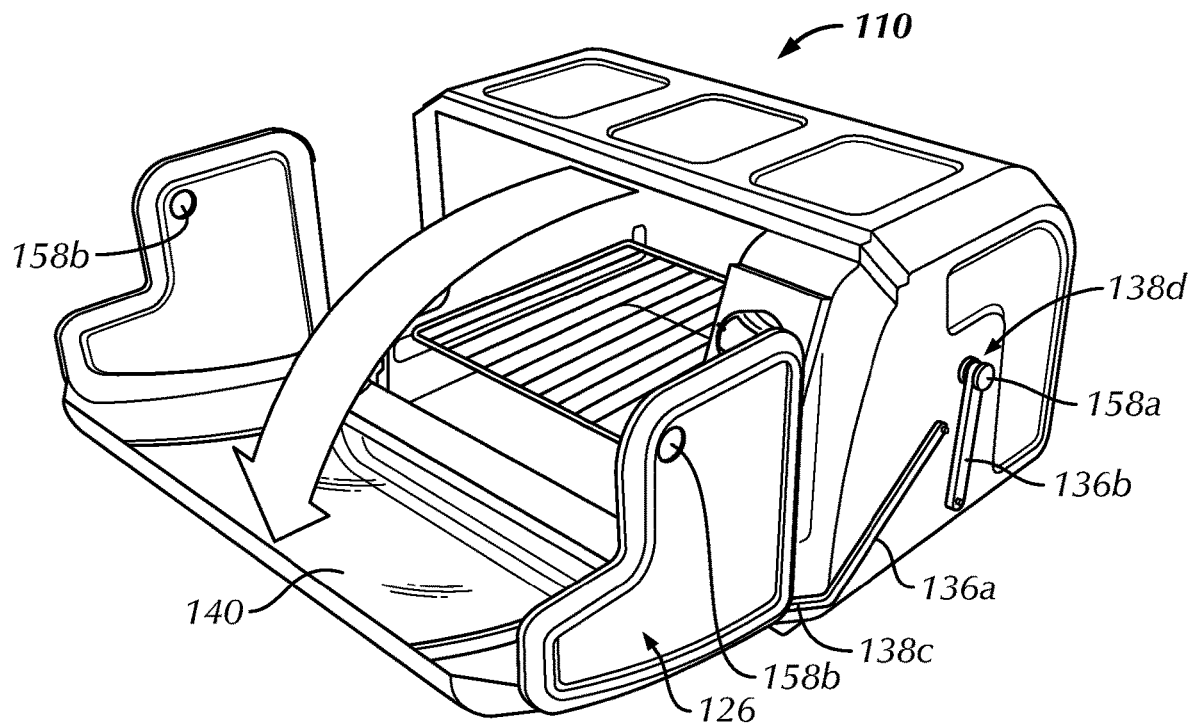
FIG. 8 is a front and side perspective view of a countertop oven in accordance with a second preferred embodiment of the present disclosure, with the door of the oven pivoted outwardly.

FIG. 8 illustrates a second embodiment of the countertop oven 110. The reference numerals of the present embodiment are distinguishable from those of the above-described first embodiment (FIGS. 1-7) by a factor of one-hundred (100), but otherwise indicate the same elements as indicated above, except as otherwise specified. The countertop oven 110 of the present embodiment is substantially similar to that of the earlier embodiment. Therefore, the description of certain similarities and modes of operation between the embodiments may be omitted herein for the sake of brevity and convenience, and, therefore, is not limiting.

One difference over the embodiment of FIGS. 1-7, as shown best in FIG. 8, is that the pivotable attachment 138d between the second rocker bar 136b and the door 126 is selectively releasable to disengage the door 126 from the second rocker bar 136b and pivot the door 126 outwardly about the pivotable attachment 138c between the first rocker bar 136a and the door 126. As shown in FIG. 8, outward pivoting of the door 126 provides access to the interior side of the glass panel 140, enabling, for example, cleaning thereof.

In the illustrated embodiment, the pivotable attachment 138d between the second rocker bar 136b and the door 126 comprises a detent. Namely, the second rocker bar 136b includes a pin 158a biased by a biasing member (not shown) into a corresponding aperture 158b in the door 126. As should be understood, the biasing member may be any member capable of storing and releasing energy. Non-limiting examples of the biasing member include a spring and the like. The pin 158a is selectively depressible to eject from the aperture 158b and release the door 126 from the second rocker bar 136b, thereby enabling pivoting thereof about the pivotable attachment 138c. To re-engage the second rocker bar 136b with the door 126, the door 126 is pivoted back such that the pin 158a contacts and slides along the door 126 under the force of the biasing member, which pushes the pin 158a back into the aperture 158b when aligned therewith. Thereafter, the door 126 is pivotable about the 4-bar linkage mechanism as described with respect to the embodiment of FIGS. 1-7. As should be understood, the releasable attachment between the door 126 and the rocker bar 136b is not limited to a detent, and may take the form of any other releasable attachment capable of selective engagement and detachment as described herein.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

We claim:

1. A countertop oven comprising:
a housing having a rear panel, an upper panel, a bottom panel, a first side panel, an opposing second side panel and an open front end, together defining a cooking cavity therebetween, the cooking cavity being accessible via the open front end;
at least one heating element within the housing to selectively heat the cooking cavity; and
a door movably attached to the housing via at least one 4-bar linkage mechanism, the door being selectively movable between a closed position, wherein the open front end of the housing is covered by the door, and an open position in which the door is positioned generally atop and parallel to the upper panel, thereby uncovering the open front end of the housing to access the cooking cavity, and
wherein the 4-bar linkage mechanism comprises a first rocker bar pivotably attached at one end thereof to the door and pivotably attached at an opposing end thereof to the first side panel of the housing, and a second rocker bar pivotably attached at one end thereof to the door and pivotably attached at an opposing end thereof to the first side panel of the housing, the oven housing defining a ground link of the 4-bar linkage mechanism and the door defining a coupler link of the 4-bar linkage mechanism movable between the open and closed positions thereof.

2. The countertop oven of claim 1, wherein the pivotable attachment between the first rocker bar and the door is positioned proximate a first edge of the door, and the pivotable attachment between the second rocker bar and the door is positioned proximate an opposing second edge of the door.

3. The countertop oven of claim 1, wherein the pivotable attachment between the second rocker bar and the door is selectively releasable to disengage the door from the second rocker bar and enable the door to pivot about the pivotable attachment between the first rocker bar and the door.

4. The countertop oven of claim 3, wherein the pivotable attachment between the second rocker bar and the door comprises a pin at the end of the second rocker, the pin being biased into a corresponding aperture in the door, and the pin being selectively depressible to release the door from the second rocker bar.

5. The countertop oven of claim 1, wherein the door includes a glass panel, the glass panel being pivotably attached to the door at one end thereof and selectively, removably latched to the door at an opposing end thereof, wherein unlatching of the opposing end of the glass panel from the door permits pivoting of the glass panel relative to the door.

6. The countertop oven of claim 5, wherein the glass panel comprises a latching member biased into a corresponding slot in the door, the latching member being selectively retractable from the slot to unlatch the glass panel from the door.

7. The countertop oven of claim 1, wherein the door includes a first side panel and an opposing second side panel, the first side panel of the door being permanently coupled to the first side panel of the housing via the 4-bar linkage mechanism.

8. The countertop oven of claim 1, wherein the door includes a glass panel, the glass panel being selectively detachable from the door.

9. The countertop oven of claim 8, wherein the glass panel is removably latched to the door, and unlatching of the glass panel from the door permits detaching the glass panel from the door, the glass panel being selectively re-attachable to the door.

10. The countertop oven of claim 9, wherein the glass panel comprises a latching member biased into a corresponding slot in the door, the latching member being selectively retractable from the slot to unlatch the glass panel from the door.

11. The countertop oven of claim 1, wherein each of the rear panel, the upper panel, the bottom panel, the first side panel, and the opposing second side panel of the housing are generally planar.

12. The countertop oven of claim 1, wherein the door is spaced upwardly from the upper panel of the housing by between approximately 15 mm to approximately 40 mm, in the open position of the door.

13. The countertop oven of claim 1, wherein the door includes a first side panel, an opposing second side panel, and a front panel extending therebetween, the front panel including a glass panel, the glass panel being at least one of pivotably and removably attached to the front panel.

14. The countertop oven of claim 1, wherein the 4-bar linkage mechanism is a 4-bar quadrilateral linkage mechanism.

* * * * *